(12) United States Patent
Gaudenz et al.

(10) Patent No.: US 7,952,849 B2
(45) Date of Patent: May 31, 2011

(54) RAIL VEHICLE WITH A WAGON BODY AND METHOD FOR PROTECTIVE GROUNDING OF SUCH A WAGON BODY

(75) Inventors: Markus Matthias Gaudenz, Erlangen (DE); Andreas Kitzmüller, Graz (AT); Rüdiger Polley, Erlangen (DE); Franz-Josef Weber, Graz (AT); Stefan Zebunke, Zapfendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/452,285

(22) PCT Filed: Jun. 23, 2008

(86) PCT No.: PCT/EP2008/057959
§ 371 (c)(1),
(2), (4) Date: Dec. 23, 2009

(87) PCT Pub. No.: WO2009/000809
PCT Pub. Date: Dec. 31, 2008

(65) Prior Publication Data
US 2010/0102643 A1    Apr. 29, 2010

(30) Foreign Application Priority Data
Jun. 28, 2007   (DE) .......................... 10 2007 029 850

(51) Int. Cl.
*H01H 47/00* (2006.01)
*H05F 3/00* (2006.01)
*H05F 3/02* (2006.01)
*B60C 19/08* (2006.01)

(52) U.S. Cl. ........................ 361/220; 361/217
(58) Field of Classification Search .................. 361/220
See application file for complete search history.

(56) References Cited

U.S. PATENT DOCUMENTS

| 1,419,289 A * | 6/1922 | Miller ............................. 246/61 |
| 5,325,259 A | 6/1994 | Paulsson |
| 7,199,990 B2 | 4/2007 | Hunner |
| 2005/0219783 A1 | 10/2005 | Hunner |

FOREIGN PATENT DOCUMENTS

| CA | 1307822 C | 9/1992 |
| DE | 3111096 A1 | 9/1982 |
| DE | 9211808 U1 | 11/1992 |
| DE | 4402023 A1 | 6/1995 |
| DE | 69019167 T2 | 12/1995 |
| DE | 19614627 A1 | 10/1997 |
| WO | WO 03065534 A1 | 8/2003 |

* cited by examiner

*Primary Examiner* — Stephen W Jackson
(74) *Attorney, Agent, or Firm* — Laurence A. Greenberg; Werner H. Stemer; Ralph E. Locher

(57) ABSTRACT

One embodiment of the present invention discloses, inter alia, a rail vehicle with a wagon body and with contact devices which are connected to the wagon body and which remain in contact with at least one rail on the track side during operation of the rail vehicle, wherein the wagon body and at least one of the contact devices are connected to each other through an electrical resistance device. According to an embodiment of the present invention, the resistance device includes a greater electric resistance in a voltage region with low voltage than in a voltage region with comparatively higher voltage.

16 Claims, 3 Drawing Sheets

RAIL VEHICLE WITH A WAGON BODY AND METHOD FOR PROTECTIVE GROUNDING OF SUCH A WAGON BODY

PRIORITY STATEMENT

This application is the national phase under 35 U.S.C. §371 of PCT International Application No. PCT/EP2008/057959 which has an International filing date of Jun. 23, 2008, which designates the United States of America, and which claims priority on German patent application number DE 10 2007 029 850.3 filed Jun. 28, 2007, the entire contents of each of which are hereby incorporated herein by reference.

FIELD

At least one embodiment of the invention generally relates to a rail vehicle with a wagon body and with at least one contact device, for example wheels or wheel sets, which are connected to the wagon body and which are in contact with at least one rail on the track side during operation of the rail vehicle, wherein the wagon body and at least one of the contact device are connected to one another by way of an electrical resistor device.

BACKGROUND

Grounding concepts of contemporary electrical and diesel-electrical rail vehicles or railway vehicles must equally meet both the requirements which are made in terms of fault-free operational current feedback into the rail—that is to say the operational grounding—and the requirements made in terms of effective protection against electrical shocks, that is to say the protective grounding.

The protection against electrical shocks requires all the metallic parts of the wagon body which could be connected to a voltage in the case of a fault to be connected with as low an impedance as possible to the railway ground, i.e. for example to the rails. Such a fault situation could take the form, for example, of a contact wire tearing off an overhead line of the route and entering into contact with the wagon body. In such a case, the wagon body would in fact be connected to a high voltage if no efficient protective grounding were provided.

Protective grounding is implemented in previously known rail vehicles using, for example, ground cables which are connected to the wheel set contacts of the rail vehicle.

SUMMARY

At least one embodiment of the invention is directed to a rail vehicle which has even better grounding behavior than previous rail vehicles.

According to the above, at least one embodiment of the invention provides that the resistor device has a larger electrical resistance in a voltage range with a low voltage than in a voltage range with a voltage which is higher in comparison.

A significant advantage of the rail vehicle according to at least one embodiment of the invention is to be seen in the fact that the resistor device has two different ranges or operating modes, specifically an operating mode with a large electrical resistance and an operating mode with a resistance which is relatively low compared thereto. In the normal operating mode of the rail vehicle, that is to say when there is no high voltage applied to the wagon body, very low impedance protective grounding of the wagon body is not required and is in some cases disadvantageous for the operating behavior of the rail vehicle. If, in fact, the electrical resistance between the wagon body and the ground or the rails is too low, there may be penetration by electrical parallel currents from the track, for example by currents from other rail vehicles which are in the same track circuit. Such inputting of parallel currents will occur, in particular, if the electrical resistance of the rails on the track side is greater than the electrical resistance of the rail vehicle, or its wagon body, located thereon; this is because the electric current will be divided between the wagon body and rail in accordance with the component resistances.

In order to prevent such penetration of undesired current into the wagon body, the grounding resistance for grounding the wagon body should be as large as possible, and at the same time the grounding resistance between the wagon body and the rails on the track side must, of course, not be too large, since otherwise there would be no efficient protective grounding in the case of a high voltage at the wagon body, since the voltage drop at a high impedance grounding resistance would be too large.

This is where at least one embodiment of the invention comes in, in that at least one embodiment of the invention provides that a resistor device with a nonlinear behavior is to be connected between the wagon body and the rails on the track side, which resistor device has two different electrical resistances or resistance ranges, specifically a high impedance resistance for the normal operating mode of the rail vehicle and a low impedance resistance range for the case of a high voltage accident.

In particular in the case of long rail vehicles, the described resistor device is advantageous because of the fact that the problem of the inputting of parallel currents into the wagon body occurs, or can occur, very frequently in such vehicles. "Long" rail vehicles are to be understood, for example, as being rail vehicles which have a length over 15 m, in particular over 20 m. Such rail vehicles may be formed, for example, by relatively long individual vehicles, by traction units or else by "normal" trains which have electrically through-connected wagons and therefore form a uniform rail vehicle, viewed in electrical terms.

The at least one contact device with which the rail vehicle forms electrical contact with the rails on the track side can be formed, for example, by way of wheels, wheel sets, under carriages or bogies of the rail vehicle.

The resistor device is preferably dimensioned in such a way that an electrical resistance between 33 m$\Omega$ and 100 m$\Omega$ occurs at voltages below a predefined first limiting voltage, in particular below 100 volts apex value, and that in the case of voltages which correspond to the operating voltage of the rail vehicle a maximum electrical resistance of 10 m$\Omega$ occurs.

The resistor device can be formed particularly easily and therefore advantageously by way of an ohmic resistance element and a nonlinear element which is connected electrically parallel thereto. Such a nonlinear element can be formed, for example, by way of a voltage arrestor, in particular a spark gap, which is activated or fired, when a predefined minimum voltage or firing voltage is applied.

Alternatively or additionally, the resistor device can also comprise a varistor which has a lower electrical resistance at relatively high voltages than at low electrical voltages.

It is also possible for the resistor device to have a semiconductor circuit which, when an electrical voltage is applied to external terminals of the semiconductor circuit turns on when the voltage exceeds a predefined turn-voltage, and in doing so reduces the resistance thereof between its external terminals.

As already stated above, the large electrical resistance element serves to avoid parallel currents from being input in the case of low wagon body voltages or in the normal operating mode. For this reason, it is considered particularly advantageous if, at least in the central region of the rail vehicle, a corresponding nonlinear resistor device is connected to the wagon body; this is because the inputting of parallel currents is relevant in particular in the case of relatively long electrical lines in the wagon body unless such inputting is prevented by way of a correspondingly large ohmic resistance element between the wagon body and rails.

All the contact devices which produce electrical contact with the rails are particularly preferably connected to the wagon body by way of a corresponding resistor device with nonlinear behavior.

At least one embodiment of the invention also relates to a method for protectively grounding a wagon body of a rail vehicle, in which the wagon body is grounded via at least one electrical contact device with at least one rail on the track side.

In order to ensure reliable protective grounding and at the same time prevent parallel currents being input from a rail on the track side into the wagon body, or at least kept small, the invention provides that at least one resistor device is used for protectively grounding, which resistor device is connected between the wagon body and the at least one contact device and has a larger electrical resistance in a voltage range with a low voltage than in a voltage range with a voltage which is higher in comparison.

With respect to the advantages of the method according to at least one embodiment of the invention, reference is made to the above statements in conjunction with the rail vehicle according to at least one embodiment of the invention since the advantages of the rail vehicle according to at least one embodiment of the invention correspond essentially to those of the method according to at least one embodiment of the invention.

BRIEF DESCRIPTION OF THE DRAWINGS

The invention will be explained in more detail below with reference to example embodiments; in the drawings.

For the sake of a clear overview, the same reference symbols are always used for identical or comparable components in FIGS. 1 to 3.

DETAILED DESCRIPTION OF THE EXAMPLE EMBODIMENTS

Figure 1:
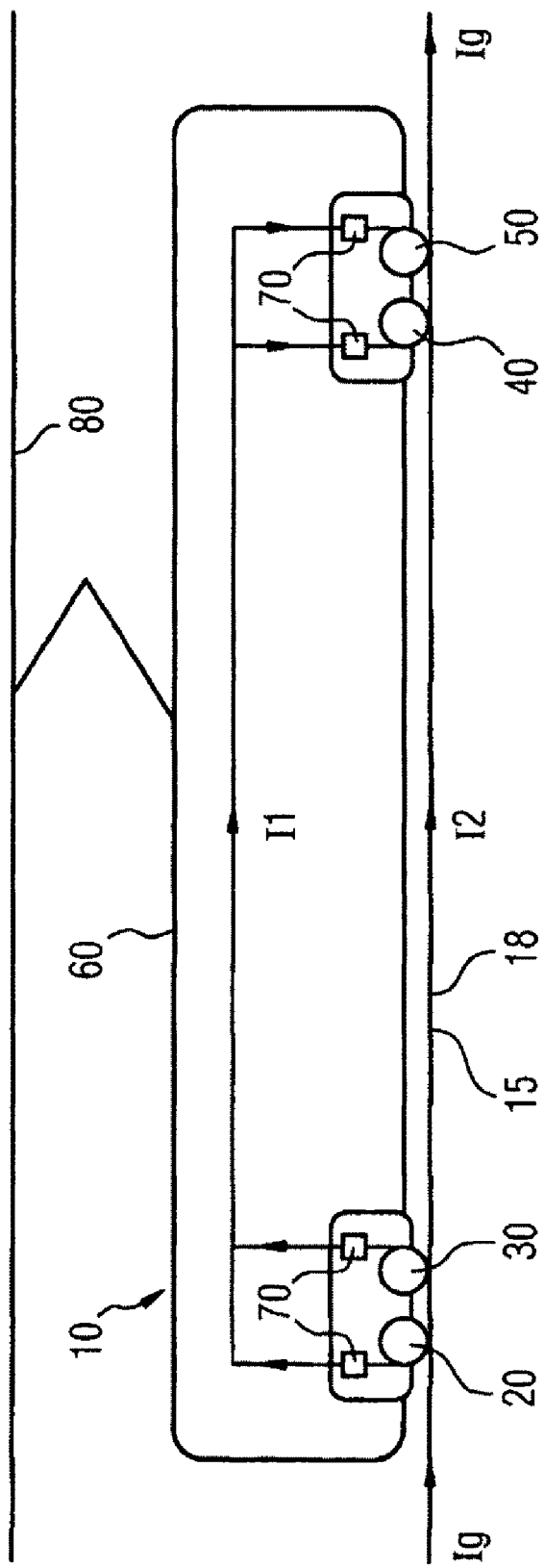
FIG. 1 shows by way of example an example embodiment of a rail vehicle according to the invention in longitudinal section on a rail on the track side.

FIG. 1 shows a rail vehicle 10 which is located on rails 15 of a track bed 18. The rail vehicle 10 has wheels 20, 30, 40 and 50 which produce electrical contact with the rails 15 of the track bed 18.

In order to permit protective grounding of a wagon body 60 of the rail vehicle 10, individual wheels 20, 30, 40 and 50, or all thereof, are connected electrically to the wagon body 60.

If an electrical current flows through the rails 15 of the track bed 18, as is indicated by the reference symbol Ig in FIG. 1, a part I1 of this current can be input into the wagon body 60 via the front wheels 20 and 30, and fed back into the track bed 18, again via the rear wheels 40 and 50. A proportion I1 of the total current Ig would therefore flow in the wagon body 60, specifically parallel to the component current I2 which flows in the rails 15 of the track bed 18. The following applies here:

$Ig = I1 + I2$

The lower the electrical resistance of the wagon body 60 of the rail vehicle 10 compared to the electrical resistance of the rail 15, the larger the proportion I1 of current compared to the proportion I2 of current.

In order to keep the proportion I1 of current in the wagon body 60 as low as possible, at least one of the wheels of the rail vehicle 10, particularly preferably each wheel, is respectively connected to the wagon body 60 via an electrical resistor device 70 which has a "nonlinear behavior" and a larger electrical resistance in a voltage range with a low voltage than in a voltage range with a voltage which is higher in comparison.

The resistor device 70 ensures here that in the normal operating mode of the rail vehicle 10 a relatively large electrical resistance is brought about between the respectively assigned wheel and the wagon body 60, with the result that the overall electrical resistance of the rail vehicle 10 becomes relatively large and the portion I1 of current remains relatively small compared to the portion I2 of current. Nevertheless, the resistor device 70 ensures efficient protective grounding of the wagon body 60 since, specifically in the case of a high voltage on a wagon body 60, said high voltage is passed on efficiently to the rails 15 and therefore into the track bed 18 via the resistor device 70. Such a high voltage could occur, for example, if a contact wire 80 (illustrated only schematically in FIG. 1) of an overhead line drops onto the rail vehicle 10 and therefore places the wagon body 60 at a high voltage.

Figure 2:
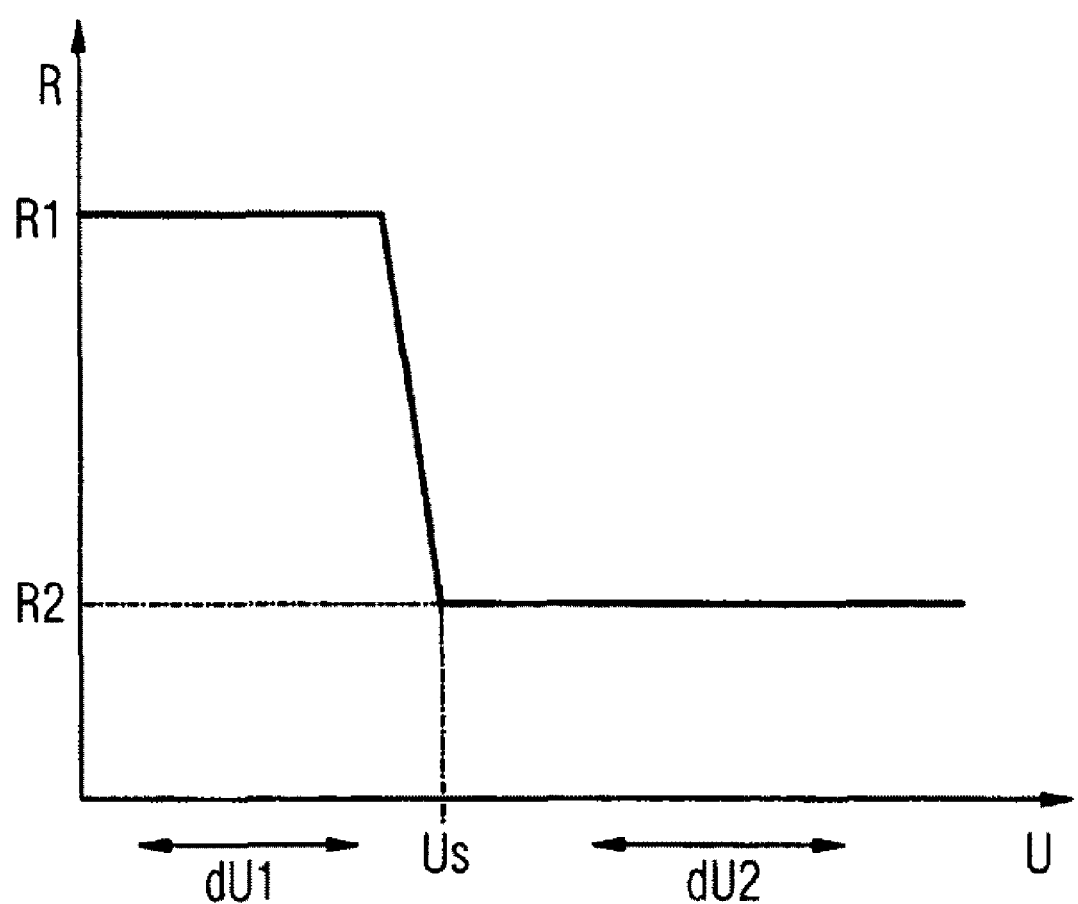
FIG. 2 shows by way of example the electrical behavior of a resistor device of the rail vehicle according to FIG. 1.

FIG. 2 shows an example embodiment of the electrical behavior of the resistor device 70 according to FIG. 1. The electrical profile of the electrical resistance R plotted against the voltage U dropping at the external terminals of the resistor device 70 is illustrated. It is apparent that in a lower voltage range dU1 below a voltage Us a relatively large electrical resistance R1 occurs, and in a relatively high voltage range dU2 above a threshold voltage Us the resistance drops to a value R2.

Suitable value ranges for Us, R1 and R2 are, for example:
dU1: 0 volt to 100 volts
dU2: 100 volts to 100 kV
R1: 33 mΩ to 100 mΩ
R2: 0 mΩ to 10 mΩ
Us: between dU1 and dU2

Figure 3:
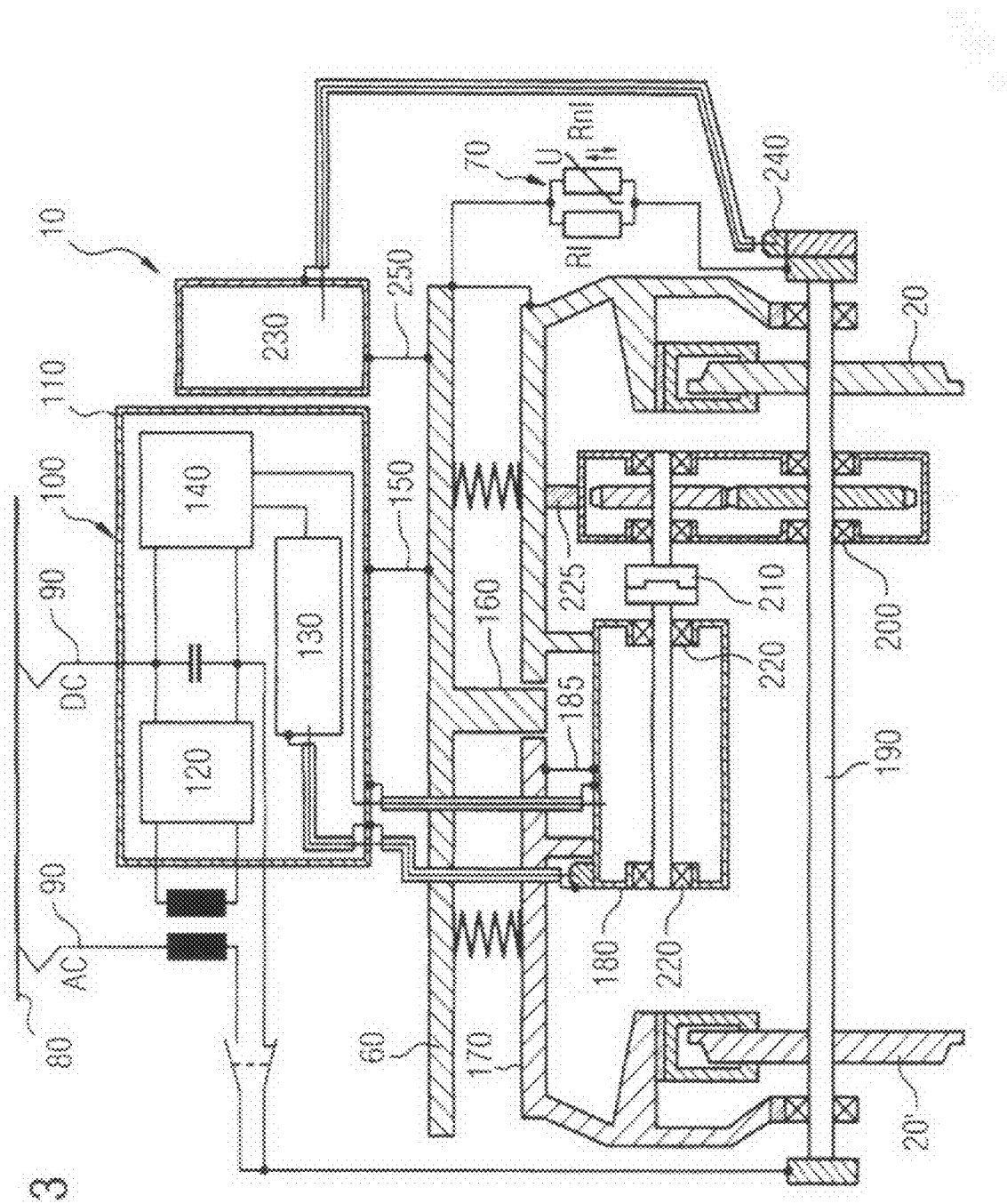
FIG. 3 shows by way of example the rail vehicle according to FIG. 1 in cross section in a schematic illustration.

Electrical behavior such as is illustrated in FIG. 2 can be brought about, for example, by way of an ohmic resistance R1 parallel to which a nonlinear element Rn1, such as for example an overvoltage arrestor or a spark gap, is connected (cf. FIG. 3). Alternatively, such a resistor device 70 can also comprise a varistor or a corresponding semiconductor circuit which brings about the correspondingly described electrical behavior.

FIG. 3 illustrates, by way of example, the rail vehicle 10 according to FIG. 1 in cross section. It is possible to see the contact wire 80 with which it is possible to make contact with one of the two pantographs 90 which permit the rail vehicle 10 to operate either in the alternating current selectively operating mode or in the direct current operating mode.

An actuation circuit 100, which is accommodated in an electrically screened container 110, is connected to the two pantographs 90. The actuation circuit 100 comprises, for example, a four quadrant chopper 120, a drive control device 130 and a pulse-controlled inverter 140.

As is apparent in FIG. 1, the container 110 is electrically connected to the wagon body 60 of the rail vehicle 10; only a base plate of the wagon body 60 is shown by way of example in FIG. 3. The connection between the wagon body 60 and the container 110 is made via a grounding line 150.

The wagon body 60 is connected via a pivot spindle 160 to a bogie 170 in which a traction motor 180 is also accommodated. The housing of the traction motor 180 is connected to the bogie 170 via a grounding line 185.

The bogie 170 is supported mechanically, but in an electrically isolated fashion, by two wheels 20 and 20' which are connected by an axle 190. The axle 190 is connected via a transmission 200 and a clutch 210 to the traction motor 180, wherein the housing of the traction motor 180 is isolated from the drive branch by way of electrically isolated bearings 220.

In FIG. 3, electrically isolated bearings are marked by a thicker line than electrically non-isolated bearings. Furthermore, conductive material is marked by hatching and non-conductive material 225 is marked in black.

Furthermore, FIG. 3 shows a brake controller 230 which is connected to a rotational speed signal generator 240 which measures the rotational speed of the axle 190 and outputs corresponding signals. The brake controller 230 is electrically connected to the wagon body 60 via a grounding line 250.

FIG. 3 also shows an example embodiment of the resistor device 70 according to FIG. 1. It is apparent that the resistor device 70 is electrically connected between the wagon body 60 and the axle 190 or the two wheels 20 and 20'. The resistor device 70 comprises an ohmic resistance element R1 and a nonlinear resistance element Rn1 which is connected parallel thereto and is formed, for example, by a spark gap.

In the normal operating mode of the rail vehicle 10, the resistor device 70 has a relatively high electrical resistance R1 with the result that an undesired flow of current through the wheels 20 and 20' or the axle 190 and through the resistor device 70 into the wagon body 60 is avoided.

In the case of a high voltage at the wagon body 60, such as could occur, for example, if the contact wire 80 drops to the wagon body 60 of the rail vehicle 10 or is placed in contact therewith, the high voltage is nevertheless efficiently diverted by the resistor device 70 because the latter assumes a low impedance specifically in the case of a spark flashover when there are high electrical voltages across the spark gap Rn1 and diverts the high voltage via the wheels 20 and 20' or into the rails 50 of the track bed 18.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A rail vehicle comprising:
    a wagon body;
    at least one contact device, connected to the wagon body and in contact with at least one rail on a track side during operation of the rail vehicle; and
    an electrical resistor device, connecting the wagon body and at least one of the at least one contact devices, the electrical resistor device including a relatively larger electrical resistance in a voltage range with a relatively low voltage as compared to a voltage range with a relatively high voltage.

2. The rail vehicle as claimed in claim 1, wherein the at least one contact device is formed by a wheel, wheel set, undercarriage or bogie.

3. The rail vehicle as claimed in claim 1, wherein the electrical resistor device is dimensioned in such a way that an electrical resistance of at least 33 mΩ occurs at voltages below 100 volts, and wherein, in a case of voltages which correspond to the operating voltage of the rail vehicle, a maximum electrical resistance of 10 mΩ occurs.

4. The rail vehicle as claimed in claim 1, wherein the electrical resistor device comprises an ohmic resistance element and an electrically nonlinear element, connected parallel thereto.

5. The rail vehicle as claimed in claim 4, wherein the electrically nonlinear element has an overvoltage arrestor which is activated when a predefined activation voltage is applied.

6. The rail vehicle as claimed in claim 4, wherein the electrically nonlinear element has a spark gap which is fired when an activation voltage is applied.

7. The rail vehicle as claimed in claim 1, wherein the electrical resistor device comprises a varistor.

8. The rail vehicle as claimed in claim 1, wherein the electrical resistor device has a semiconductor circuit which, when a voltage above a turn-on voltage is applied to external terminals of the semiconductor circuit, turns on and reduces the resistance thereof between these external terminals.

9. The rail vehicle as claimed in claim 1, wherein the at least one contact device, which is in a central region of the rail vehicle, is electrically connected to the wagon body by way of the electrical resistor device.

10. The rail vehicle as claimed in claim 9, wherein the at least one contact device, located in the central region of the rail vehicle, is a central wheel, wheel set, undercarriage or bogie.

11. The rail vehicle as claimed in claim 10, wherein all the wheels, wheel sets, undercarriages or bogies of the rail vehicle are electrically connected to the wagon body by way of one or more electrical resistor devices.

12. A method for protectively grounding a wagon body of a rail vehicle, comprising:
    grounding the wagon body via at least one electrical contact device with at least one rail on the track side, with at least one resistor device being used for grounding, the at least one resistor device being connected between the wagon body and the at least one contact device and including a relatively larger electrical resistance in a voltage range with a relatively low voltage as compared to a voltage range with a relatively high voltage.

13. The method as claimed in claim 12, wherein the at least one contact device, which is located in a central region of the rail vehicle, is protectively grounded.

14. The method as claimed in claim 13, wherein all the at least one contact devices of the rail vehicle are protectively grounded by one or more resistor devices.

15. The method as claimed in claim 13, wherein the at least one contact device is a wheel, wheel set, undercarriage or bogie.

16. The method as claimed in claim 15, wherein all the wheels, wheel sets, undercarriages or bogies of the rail vehicle are protectively grounded by one or more resistor devices.

* * * * *